United States Patent
Miki et al.

(10) Patent No.: US 9,313,787 B2
(45) Date of Patent: *Apr. 12, 2016

(54) BASE STATION AND TRANSMISSION METHOD

(71) Applicant: NTT DOCOMO, INC., Tokyo (JP)

(72) Inventors: Nobuhiko Miki, Yokohama (JP);
Kenichi Higuchi, Yokohama (JP);
Mamoru Sawahashi, Yokohoma (JP)

(73) Assignee: NTT DOCOMO, INC., Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 13/940,049

(22) Filed: Jul. 11, 2013

(65) Prior Publication Data

US 2013/0301576 A1    Nov. 14, 2013

Related U.S. Application Data

(62) Division of application No. 12/304,731, filed as application No. PCT/JP2007/062057 on Jun. 14, 2007, now Pat. No. 8,503,378.

(30) Foreign Application Priority Data

Jun. 19, 2006   (JP) ................................. 2006-169455

(51) Int. Cl.
*H04W 72/12*    (2009.01)
*H04W 72/04*    (2009.01)
(Continued)

(52) U.S. Cl.
CPC ......... *H04W 72/0453* (2013.01); *H04B 7/2621* (2013.01); *H04L 1/003* (2013.01); *H04L 1/0013* (2013.01); *H04L 1/0027* (2013.01); *H04L 1/08* (2013.01); *H04L 5/006* (2013.01);
(Continued)

(58) Field of Classification Search
None
See application file for complete search history.

(56) References Cited

U.S. PATENT DOCUMENTS 6,947,748 B2    9/2005   Li et al.
8,031,583 B2 *  10/2011  Classon et al. ................ 370/208
(Continued)

FOREIGN PATENT DOCUMENTS

EP    1724948 A1    11/2006
JP    2005-110130    4/2005
(Continued)

OTHER PUBLICATIONS

International Search Report (English & Japanese) for PCT/JP2007/062057 mailed Sep. 25, 2007 (7 pages).
(Continued)

*Primary Examiner* — Sulaiman Nooristany
(74) *Attorney, Agent, or Firm* — Osha Liang LLP

(57) ABSTRACT

A communication terminal in a multi-carrier system using a frequency bandwidth including a plurality of resource blocks, each of the resource blocks including one or more sub-carriers. The communication terminal includes a receiving unit configured to receive a signal in which a control channel is multiplexed into a single radio frame based on a number of control channels allocated into the single radio frame to use a lower coding rate by repeating transmitting without changing encoding method in which a channel other than the control channel is multiplexed in accordance with scheduling information for allocating one or more of the plurality of resource blocks to the communication terminal and a processing unit configured to perform a process on the signal received by the receiving unit.

9 Claims, 11 Drawing Sheets

(51) Int. Cl.
*H04B 7/26* (2006.01)
*H04L 1/08* (2006.01)
*H04L 1/00* (2006.01)
*H04L 1/18* (2006.01)
*H04L 5/00* (2006.01)
*H04W 88/08* (2009.01)

(52) U.S. Cl.
CPC ............ *H04L 5/0094* (2013.01); *H04L 1/0003* (2013.01); *H04L 1/0026* (2013.01); *H04L 1/1812* (2013.01); *H04L 5/0037* (2013.01); *H04L 5/0048* (2013.01); *H04W 72/12* (2013.01); *H04W 88/08* (2013.01)

(56) References Cited

U.S. PATENT DOCUMENTS

| | | |
|---|---|---|
| 2002/0159430 A1 | 10/2002 | Atarashi et al. |
| 2004/0082356 A1 | 4/2004 | Walton et al. |
| 2004/0190482 A1 | 9/2004 | Baum et al. |
| 2005/0063331 A1 | 3/2005 | Kim et al. |
| 2005/0068884 A1 | 3/2005 | Yoon et al. |
| 2005/0181832 A1 | 8/2005 | Ishii et al. |
| 2005/0220002 A1 | 10/2005 | Li et al. |
| 2006/0083157 A1 | 4/2006 | Cheng et al. |
| 2007/0026808 A1 | 2/2007 | Love et al. |
| 2007/0178928 A1 | 8/2007 | Ode |
| 2007/0189199 A1 | 8/2007 | Nishio |
| 2007/0291702 A1 | 12/2007 | Nanba et al. |
| 2008/0085718 A1 | 4/2008 | Kuchibhotla et al. |
| 2009/0161611 A1* | 6/2009 | Kuroda .......................... 370/329 |

FOREIGN PATENT DOCUMENTS

| | | |
|---|---|---|
| KR | 20050083085 A | 8/2005 |
| KR | 20050110692 A | 11/2005 |
| WO | 03058871 A1 | 7/2003 |
| WO | 2005/096522 A1 | 10/2005 |
| WO | 2006/043588 | 4/2006 |

OTHER PUBLICATIONS

Written Opinion of ISA (Japanese) mailed Sep. 25, 2007 (3 pages).
"A Practical Discrete Multitone Transceiver Loading Algorithm for Data Transmission over Spectrally Shaped Channels" Peter S. Chow, John M. Cioffi and John A.C. Bingham IEEE Transactions on Communications, vol. 43, No. 2/3/4 Feb./Mar. Apr. 1995, (3 pages).
Extended European search report for European Application No. 07745314.0 dated Feb. 18, 2013 (8 pages).
Office Action in counterpart Indian Patent Application No. 5108/KOLNP/2008, dated Feb. 20, 2015 (7 pages).
Office Action in corresponding Korean Patent Application No. 10-2009-7000227 dated Jul. 29, 2013, with translation (7 pages).
Espacenet Publication Abstract for KR20050110692, publication date Nov. 23, 2005 (2 pages).

* cited by examiner

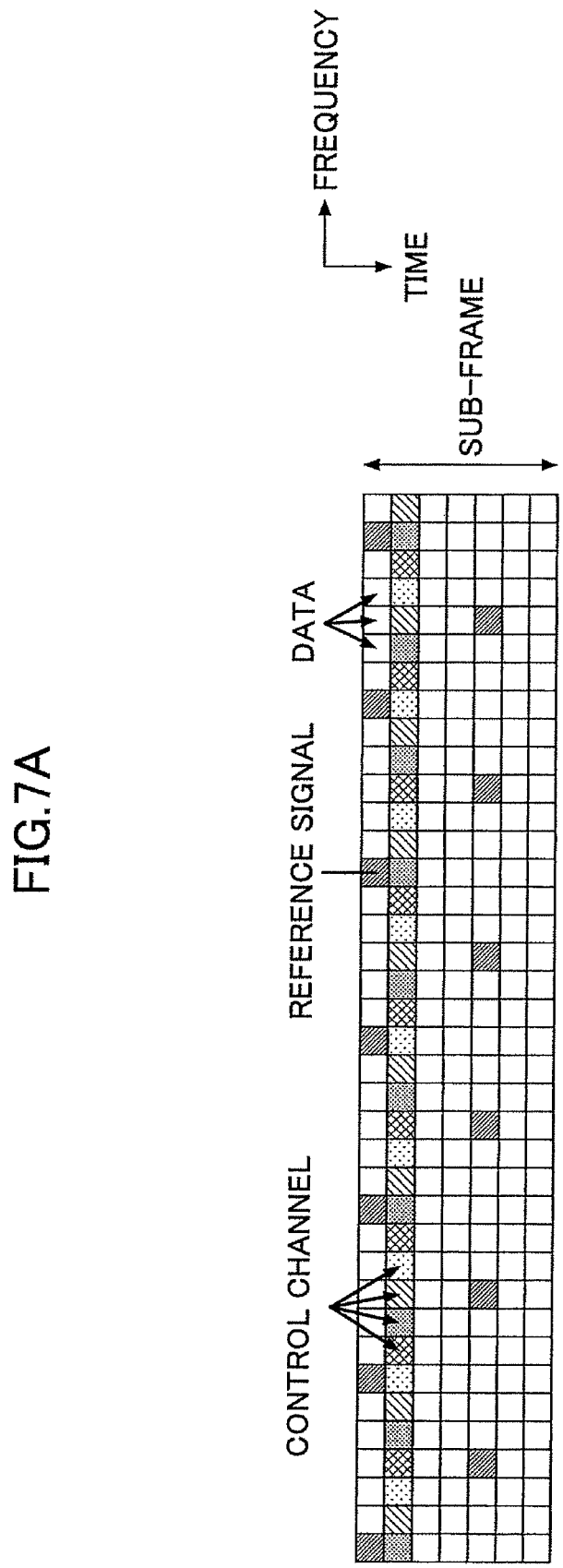

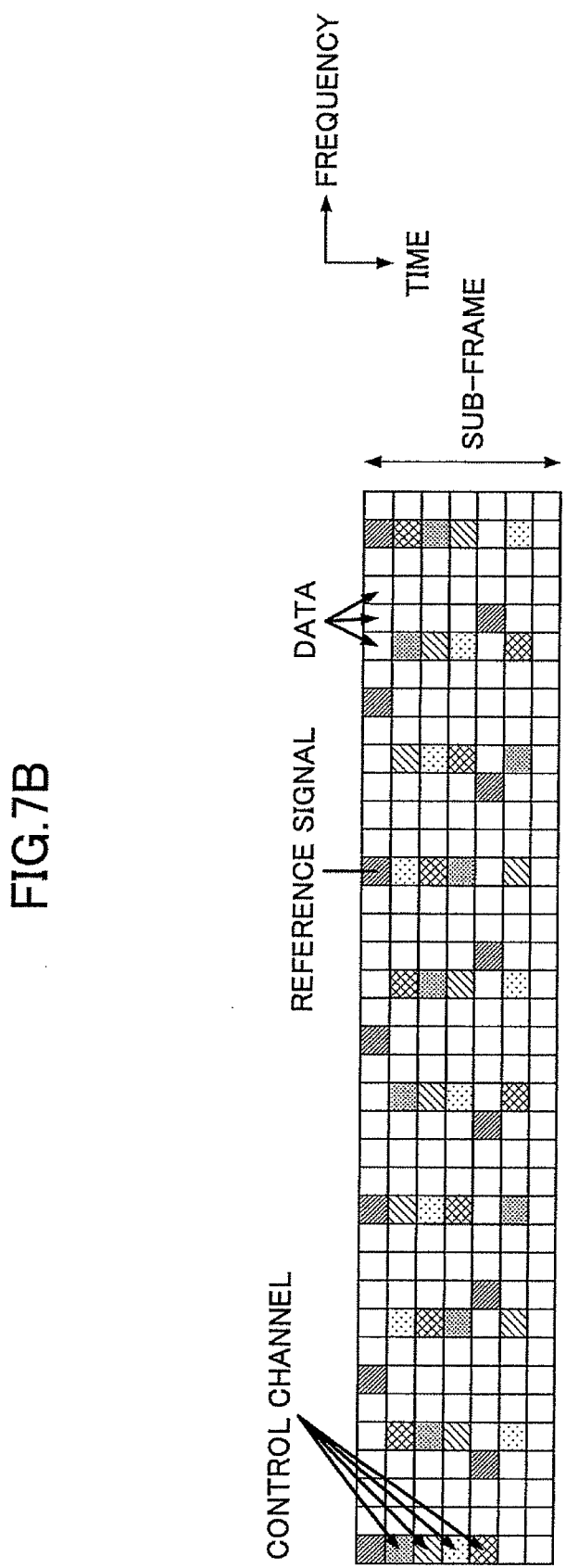

BASE STATION AND TRANSMISSION METHOD

CROSS-REFERENCE TO RELATED APPLICATIONS

The present application is a continuation application of and, thereby, claims benefit under 35 U.S.C. §120 to U.S. patent application Ser. No. 12/304,731 filed on Dec. 12, 2008, titled, "BASE STATION AND TRANSMISSION METHOD," which is a national stage application of International Application No. PCT/JP2007/062057, filed on Jun. 14, 2007, which claims priority to Japanese Patent Application No. 2006-169455 filed on Jun. 19, 2006. The contents of the priority applications are incorporated by reference in their entirety.

TECHNICAL FIELD

The present invention generally relates to the technical field of radio communications, and more particularly to a base station and a transmission method used in a communication system where frequency scheduling and multi-carrier transmission are performed.

BACKGROUND ART

In the technical field, recently, it has become more and more important to provide a wideband radio access scheme where high-speed and high-capacity communications are effectively performed. To that end, a multi-carrier system, more specifically, an Orthogonal Frequency Division Multiplexing (OFDM) system is expected to be used in downlink transmission from a viewpoint that high-speed and high-capacity communication may be performed while multi-path fading may be effectively reduced. Further, for a next-generation system, a frequency scheduling scheme is also being proposed from a viewpoint of enhancing efficiency of frequency use and throughput.

As shown in FIG. 1, a frequency band usable in a system may be divided into plural resource blocks (divided into three in the example of FIG. 1), and each resource block includes one or more sub-carriers. The resource block may be also called a "frequency chunk", and one or more resource blocks are allocated to a terminal. In the frequency scheduling, the resource blocks may be preferentially allocated to a terminal having good channel quality in accordance with the received signal quality or a Channel Quality Indicator (CQI) with respect to each resource block of the downlink pilot channel (PICH) reported from each terminal. By doing this, the transmission efficiency and the throughput of the total system are intended to be improved. In a case where the frequency scheduling is preformed, it is necessary to notify the content of the scheduling to the terminal. The content is transmitted through a control channel (CCH) (or may be called an L1/L2 control signaling channel or an associated control channel). In addition, through the control channel (CCH), a modulation method to be used in scheduled resource blocks (such as QPSK, 16QAM, and 64QAM), channel coding information (such as a channel coding rate), and a Hybrid Auto Repeat ReQuest (HARQ) scheme are also transmitted. The technique of dividing a frequency band into plural resource blocks and selecting a modulation method for each resource block is described in, for example, Non Patent Document 1.

Non Patent Document 1: P. Chow, J. Cioffi, J. Bingham, "A Practical Discrete Multitone Transceiver Loading Algorithm for Data Transmission over Spectrally Shaped Channel", IEEE Trans. Commun. vol. 43, No. 2/3/4, February/March/April 1995.

DISCLOSURE OF INVENTION

Problems to be Solved by the Invention

On the other hand, in a future next-generation radio access system, it is expected that various frequency bands including, for example, a wideband and a narrowband may be provided, and the various frequency bands may be required to be selectively used in accordance with the location of or the application being used by the terminal. In this case, a frequency bandwidth receivable by the terminal may be varied to have, for example, a wideband or a narrowband in accordance with an application to be used by and the cost of the terminal. In this case as well, when the frequency scheduling is appropriately performed, efficiency of frequency use and throughput may be enhanced. However, the frequency band used in a conventional communication system is assumed to be a fixed band. To achieve this feature, as described above, various frequency bands including, for example, a wideband or a narrowband are provided with respect to the base station and the terminal; unfortunately, no practically applicable method has been established allowing any combination of use of the various frequency bands and appropriately transmitting the content of a scheduled result to the terminal or the user.

Further, a case is considered where a certain resource block commonly used among each of the terminals is allocated to the control channel (CCH) on a fixed basis. In this case, some terminals may not receive the control channel (CCH) with sufficient quality because, typically, the channel quality of the terminal varies depending on each resource block. Further, in a case where the control channel (CCH) is separated into the resource blocks, each terminal may receive the control channel (CCH) at a certain level of received quality, but it may become difficult for the control channel (CCH) to be received at a quality level higher than the certain level. Accordingly, it is desired that the control channel (CCH) be transmitted to the terminal with high quality.

Further, when Adaptive Modulation and Coding (AMC) control is conducted where a modulation method and a channel coding rate are adaptively changed, the number of symbols necessary to transmit the control channel (CCH) may differ depending on each terminal. This is because the amount of information transmitted per symbol may differ depending on a combination of the AMC. Further, in a future system, plural antennas may be used in each of a transmitting side and a receiving side; then different signals may be transmitted and received by using the plural antennas. In this case, control information including the scheduling information may be required to be included in each signal transmitted by the plural antennas. Therefore, in this case, the number of symbols required to be transmitted on the control channel (CCH) may differ depending on not only the terminals but also the number of antennas used in the terminals. In a case where the amount of information to be transmitted through the control channel (CCH) differs depending on each terminal, a variable format capable of flexibly corresponding to the variation of the amount of the control information may be required to be used to use resources effectively. However, there is a concern that the use of the variable format may increase the burden of the signal processing in the transmitting side and the receiving side. On the other hand, when the format is to be fixed, it is necessary to allocate the field exclusively to the control channel (CCH) and in accordance with the maximum amount of the information to be transmitted. However, in a case where the field is thus allocated, even when an area in the field exclusively for the control channel (CCH) is not used, the area of the resource may not be used for data transmission; this goes against a requirement of effective use of the resources. As a result, it is desired that the control channel (CCH) be transmitted simply and effectively.

The present invention is made to address at least one of the above problems, and an object of the present invention is to provide a base station and a method capable of effectively transmitting the control channel (CCH) to each of the terminals having different usable bandwidths from each other in a communication system where a frequency band allocated to the system is divided into plural frequency blocks, each frequency block including plural resource blocks, and each resource block including one or more sub-carriers, and each terminal performs communication by using one or more frequency blocks.

Means for Solving the Problems

To solve the problem, according to an aspect of the present invention, a base station in a multi-carrier system performs frequency scheduling in a frequency bandwidth including plural resource blocks, each resource block including one or more sub-carriers. The base station includes a frequency scheduler determining scheduling information for allocating one or more resource blocks to a communication terminal having good channel quality based on a channel quality indicator reported from each communication terminal; a unit encoding and modulating a control channel transmitting the scheduling information; a multiplexing unit frequency-division multiplexing the control channel with a channel other than the control channel in accordance with the scheduling information; and a unit transmitting an output signal from the multiplexing unit in the multi-carrier system.

According to another aspect of the present invention, a transmission method is used in a base station in a multi-carrier system performing frequency scheduling. The transmission method includes a step of determining scheduling information for allocating one or more resource blocks to a communication terminal having good channel quality based on a channel quality indicator reported from each communication terminal; a step of encoding and modulating a control channel transmitting the scheduling information; a step of frequency-division multiplexing the control channel with a channel other than the control channel in accordance with the scheduling information; and a step of transmitting an output signal from the multiplexing unit in the multi-carrier system.

According to an aspect of the present invention, the control channel (CCH) may be frequency-division multiplexed with the other channel such as data channel (DCH); and the transmission power may be adjusted between the control channel (CCH) and other channel, thereby increasing the coverage area of the base station.

Advantageous Effect of the Invention

According to an embodiment of the present invention, there are provided a base station and a method capable of effectively transmitting the control channel (CCH) to each of the terminals having different usable bandwidths from each other in a communications system where a frequency band allocated to the system is divided into plural frequency blocks, each frequency block including plural resource blocks, each resource block including one or more sub-carriers, and the terminal performs communication by using one or more frequency blocks.

BRIEF DESCRIPTION OF THE DRAWINGS

FIG. 7A is a drawing showing a method of multiplexing the control channel with another channel;

FIG. 7B is a drawing showing another method of multiplexing the control channel with another channel;

EXPLANATION OF REFERENCES

Figure 1:
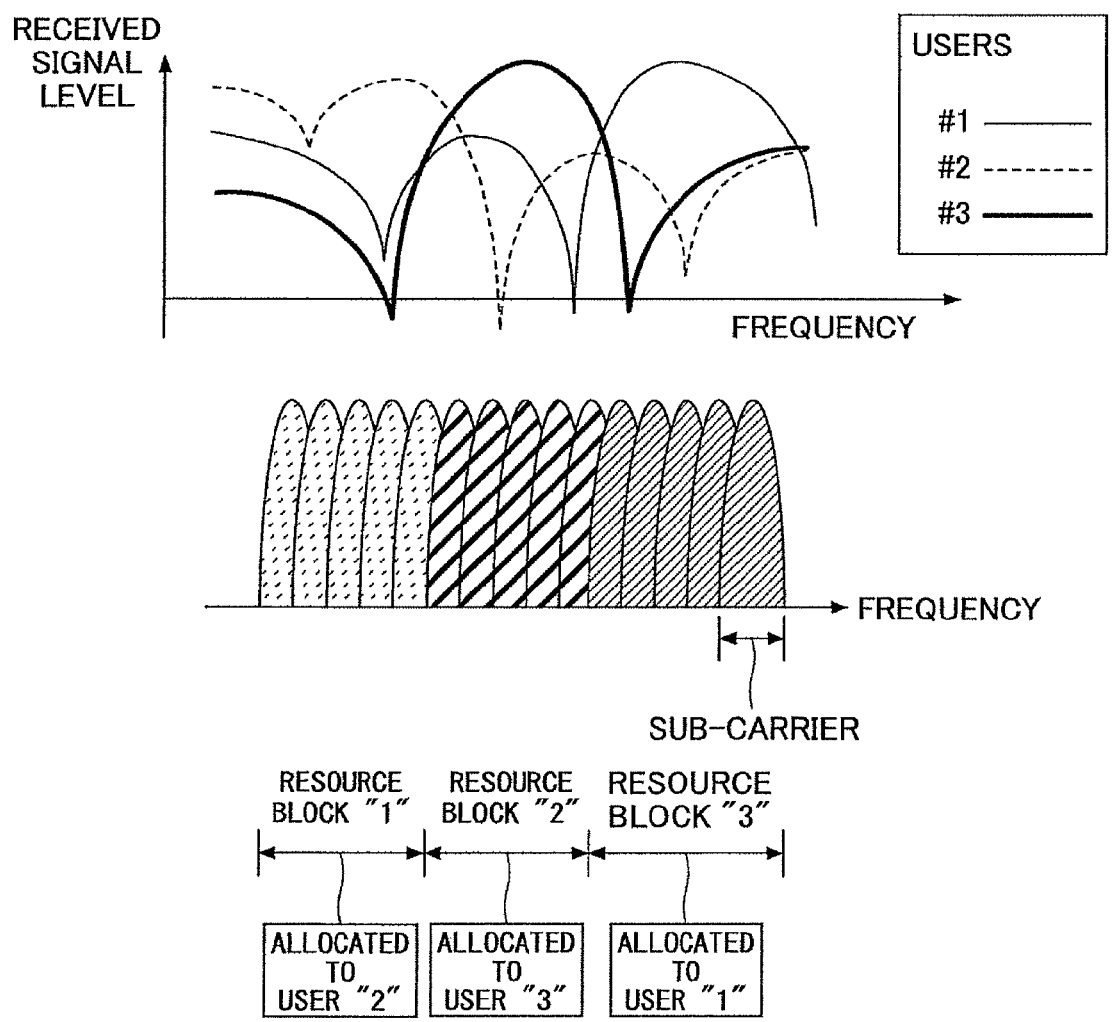
FIG. 1 is a drawing showing a frequency scheduling scheme.

31 FREQUENCY BLOCK ALLOCATION CONTROLLING SECTION
32 FREQUENCY SCHEDULING SECTION
33-$x$ CONTROL SIGNALING CHANNEL GENERATING SECTION WITH RESPECT TO FREQUENCY BLOCK "x"
34-$x$ DATA CHANNEL GENERATING SECTION WITH RESPECT TO FREQUENCY BLOCK "x"
35 BROADCAST CHANNEL (OR PAGING CHANNEL) GENERATING SECTION
1-$x$ FIRST MULTIPLEXING SECTION WITH RESPECT TO FREQUENCY BLOCK "x"
37 SECOND MULTIPLEXING SECTION
38 THIRD MULTIPLEXING SECTION
39 OTHER CHANNEL GENERATING SECTION
40 IFFT CONVERTING SECTION
41 TRANSMISSION POWER CONTROLLING SECTION
50 CYCLIC PREFIX ADDING SECTION
81 CARRIER FREQUENCY SYNCHRONIZING SECTION
82 FILTERING SECTION
83 CYCLIC PREFIX REMOVING SECTION
84 FFT CONVERTING SECTION
85 CQI MEASURING SECTION
86 BROADCAST CHANNEL DECODING SECTION
87 CONTROL CHANNEL DECODING SECTION
88 DATA CHANNEL DECODING SECTION
332 CONTROL INFORMATION GENERATING SECTION
334 TRANSMISSION PATH ENCODER
336 DATA MODULATING SECTION 338, 340 REPEAT TRANSMISSION CONTROLLING SECTION
342 PUNCTURING SECTION

BEST MODE FOR CARRYING OUT THE INVENTION

Next, embodiments of the present invention are described with reference to the accompanying drawings.

It should be noted that the same reference numeral is used for the element having the same function in each drawing, and a repeated description is omitted.

Figure 2:
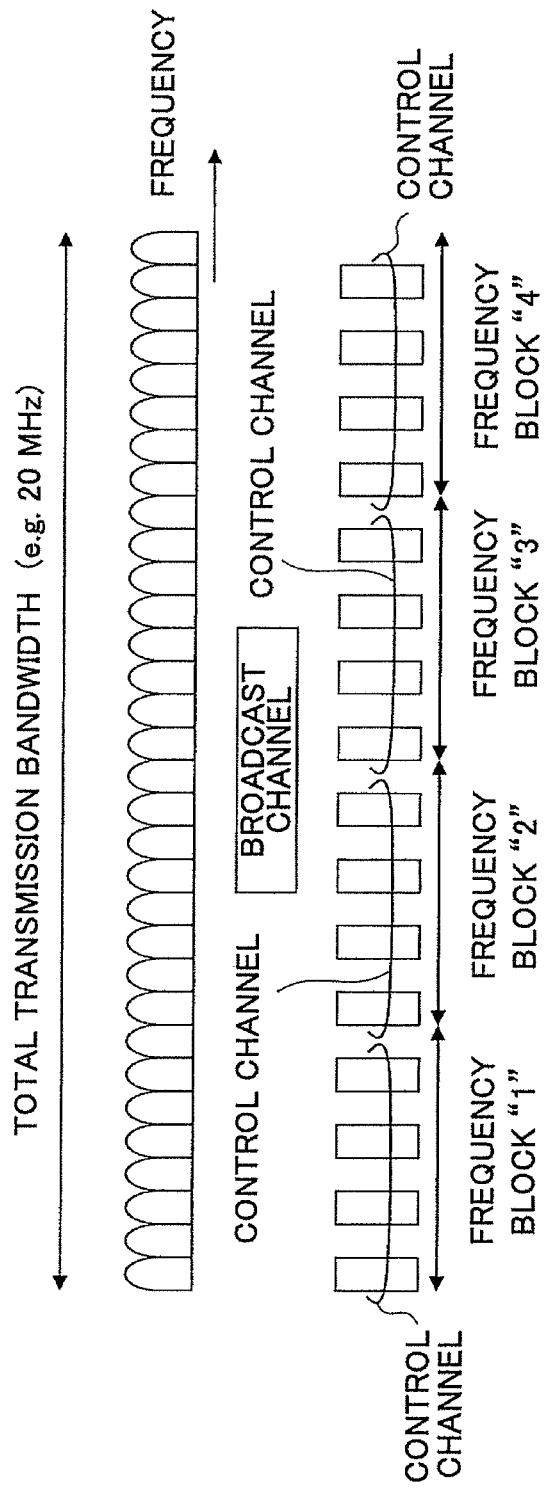
FIG. 2 is a drawing showing a frequency band used in an embodiment of the present invention.

FIG. 2 shows a frequency bandwidth used in an embodiment of the present invention. It should be noted that the figures in the drawing are examples for illustrative purposes only, and various values may be used. As shown in FIG. 2, the frequency bandwidth (total transmission bandwidth) given to a communication system is 20 MHz. In this case, the total transmission bandwidth includes frequency blocks "1" through "4", each frequency block including plural resource blocks, and each resource block including one or more sub-carriers. FIG. 2 schematically shows where each frequency block includes many sub-carriers. In this example, there are four kinds of bandwidths for a communication: 5 MHz, 10 MHz, 15 MHz, and 20 MHz. Each terminal uses one or more frequency blocks and performs communications using any of the four bandwidths. In this case, the terminal may communicate using any of the four bandwidths or using only a prescribed bandwidth. In any case, it is assumed that a bandwidth of at least 5 MHz is required for each terminal to perform communications.

In this embodiment, the bandwidth of a control channel (CCH) (or L1/L2 control signaling channel) for transmitting scheduling content of a data channel (DCH) (or shared data channel) is 5 MHz (minimum bandwidth), and the control channel (CCH) is separately provided in each frequency block. For example, when a terminal communicating using a bandwidth of 5 MHz communicates using the frequency block "1", the terminal may receive the control channel (CCH) provided in the frequency block "1" and acquire the scheduling content. The information item indicating which frequency block(s) is usable by the terminal may be previously transmitted through a broadcast channel (BCH) or the like. Further, the frequency block(s) to be used may be changed after the communications are started. When a terminal communicating using a bandwidth of 10 MHz communicates using, for example, the frequency blocks "1" and "2", the terminal uses the two adjacent frequency blocks, receives each of the control channels (CCH) provided in the frequency blocks "1" and "2", and acquires the scheduling content corresponding to a range of 10 MHz. In the same manner, when a terminal communicating using a bandwidth of 15 MHz communicates using, for example, the frequency blocks "1" through "3", the terminal uses the consecutive three frequency blocks, receives each of the control channels (CCH) provided in the frequency blocks "1" through "3", and acquires the scheduling content corresponding to a range of 15 MHz. When a terminal communicating using a bandwidth of 20 MHz communicates using all the frequency blocks, the terminal uses the four frequency blocks, receives each of the control channels (CCH) provided in the frequency blocks "1" through "4", and acquires the scheduling content corresponding to a range of 20 MHz.

In FIG. 2, with respect to the control channel (CCH), there are four discrete blocks depicted in each frequency block. This shows that the control channel (CCH) is separately mapped onto the plural resource blocks. A specific example of the mapping of the control channel (CCH) is described below.

Figure 3:
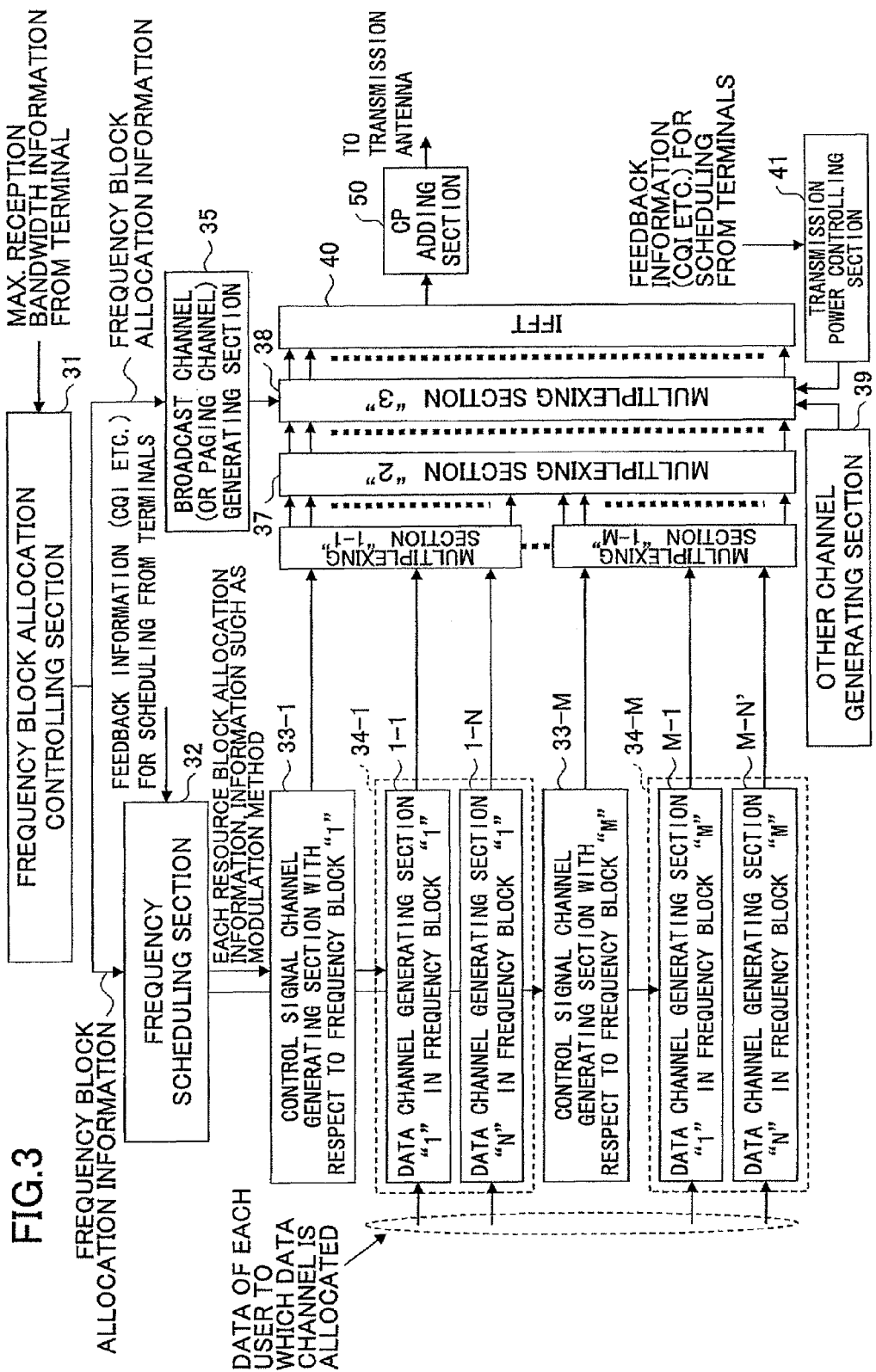
FIG. 3 is a partial block diagram showing a base station apparatus according an embodiment of the present invention.

FIG. 3 is a partial block diagram of a base station according to an embodiment of the present invention. As shown in FIG. 3, the base station includes a frequency block allocation controlling section 31, a frequency scheduling section 32, a control signaling channel generating section "33-1" with respect to a frequency block "1", a data channel generating section "34-1" with respect to the frequency block "1", a control signaling channel generating section "33-M" with respect to a frequency block "M", a data channel generating section "34-M" with respect to the frequency block "M", a broadcast channel (or a paging channel) generating section 35, a first multiplexing section "1-1" with respect to the frequency block "1", a first multiplexing section "1-M" with respect to the frequency block "M", a second multiplexing section 37, a third multiplexing section 38, an other channel generating section 39, an IFFT converting section 40, a transmission power controlling section 41, and a cyclic prefix (CP) adding section 50.

Based on the information item indicating the maximum bandwidth usable by a terminal (mobile terminal or fixed terminal), the information item being transmitted from the terminal, the frequency block allocation controlling section 31 checks the frequency block(s) used by the terminal. Further, the frequency block allocation controlling section 31 manages the corresponding relationship between each terminal and the corresponding frequency block(s) and reports the content of the corresponding relationship to the frequency scheduling section 32. The information item indicating which frequency block(s) can be used by the terminal with respect to the bandwidth used by the terminal may be previously transmitted through a broadcast channel (BCH). For example, the broadcast channel (BCH) may transmit an information item indicating that any of the frequency blocks "1" through "4" may be used by a user who uses a bandwidth of 5 MHz. Otherwise, the broadcast channel (BCH) may transmit to the user the information indicating that only a limited number of the frequency blocks among the frequency blocks "1" through "4" may be used. Further, with respect to a user who communicates using a bandwidth of 10 MHz, the use of two adjacent frequency blocks such as a combination of the frequency blocks "1" and "2", "2" and "3", or "3" and "4" is allowed. In this case, all the combinations are allowed.

Otherwise, only a limited combination(s) of the frequency blocks is allowed. In the same manner, with respect to a user who communicates using a bandwidth of 15 MHz, the use of three consecutive frequency blocks such as a combination of the frequency blocks "1" through "3", or "2" and "4" may be allowed. In this case, both or only either of the combinations is allowed. With respect to a user who communicates using a bandwidth of 20 MHz, the use of all the frequency blocks is allowed. Further, as described below, the usable frequency block(s) may be changed according to a prescribed frequency hopping pattern after communications are started.

The frequency scheduling section 32 performs frequency scheduling in each of the plural frequency blocks. In a process of the frequency scheduling with respect to a single frequency block, the frequency scheduling section 32 determines scheduling information so that the resource blocks are preferentially allocated to a terminal having good channel quality based on a reported Channel Quality Indicator (CQI) of each resource block from the terminals. Further, the frequency scheduling section 32 may determine the number of users who are multiplexed onto the same sub-frame based on the CQI reported from each communication terminal. For example, by decreasing the number of users who are multiplexed onto the same sub-frame, the transmission power per control channel (CCH) may be increased. As a result, it may become possible to allow a mobile station located close to a cell boundary to receive the control channel (CCH), thereby enabling increasing the coverage of the base station.

The control signaling channel generating section "33-1" with respect to a frequency block "1" generates a control signaling channel for announcing the scheduling information of the frequency block "1" using only the resource block(s) of the frequency block "1". In the same manner, with respect to each of the other frequency blocks, a control signaling channel for announcing the schedule information of the corresponding frequency block is generated using only the resource block(s) of the corresponding frequency block.

The data channel generating section "34-1" with respect to the frequency block "1" generate a data channel transmitted using one or more resource blocks of the frequency block "1". The frequency block "1" may be shared among one or more terminals (users). Therefore, in the case as shown in FIG. 3, N data channel generation sections "1-1" through "1-N" are provided. In the same manner, with respect to each of the other frequency blocks, the corresponding data channel with respect to the terminals sharing the frequency block is generated.

The a first multiplexing section "1-1" with respect to the frequency block "1" multiplexes a signal with respect to the frequency block "1". This multiplexing process includes at least a frequency-division multiplexing process. An explanation how the control signaling channel and the data channels are multiplexed is described below. In the same manner, with respect to each of the other first multiplexing sections "1-$x$", the control signaling channel and the data channels transmitted using the frequency block "x" are multiplexed.

The second multiplexing section 37 changes the positional relationship among plural first multiplexing sections "1-$x$" ($x=1, \ldots, M$) on the frequency axis in accordance with a prescribed hopping pattern.

The broadcast channel (or a paging channel) generating section 35 generates broadcast information such as station data to be transmitted to the terminals under the coverage. The broadcast information may include an information item indicating the relationship between the maximum frequency bandwidth usable by a terminal and the frequency block(s) usable by the terminal. Further, when usable frequency blocks are to be changed, an information item designating the hopping pattern indicating how the usable frequency blocks are to be changed may be included in the broadcast information. It should be noted that the paging channel (PCH) may be transmitted in the same band as the broadcast channel (BCH) or transmitted using the frequency block(s) used by each terminal.

The other channel generating section 39 generates a channel(s) other than the control signaling channel and the data channel. For example, the other channel generating section 39 generates a pilot channel.

The third multiplexing section 38 multiplexes the control signaling channel and the data channel of each frequency block with the broadcast channel and/or other channel(s) on an as-needed basis.

The transmission power controlling section 41 controls the transmission power allocated to the control channel (CCH) and the data channel.

The IFFT converting section 40 performs IFFT conversion and OFDM modulation on the signal output from the third multiplexing section 38.

The cyclic prefix (CP) adding section 50 adds a guard interval to the OFDM modulated symbol and generates a transmission symbol. The transmission symbol may be generated by, for example, adding a series of the end (or top) data of the OFDM symbol to the top (or end).

Figure 4A:
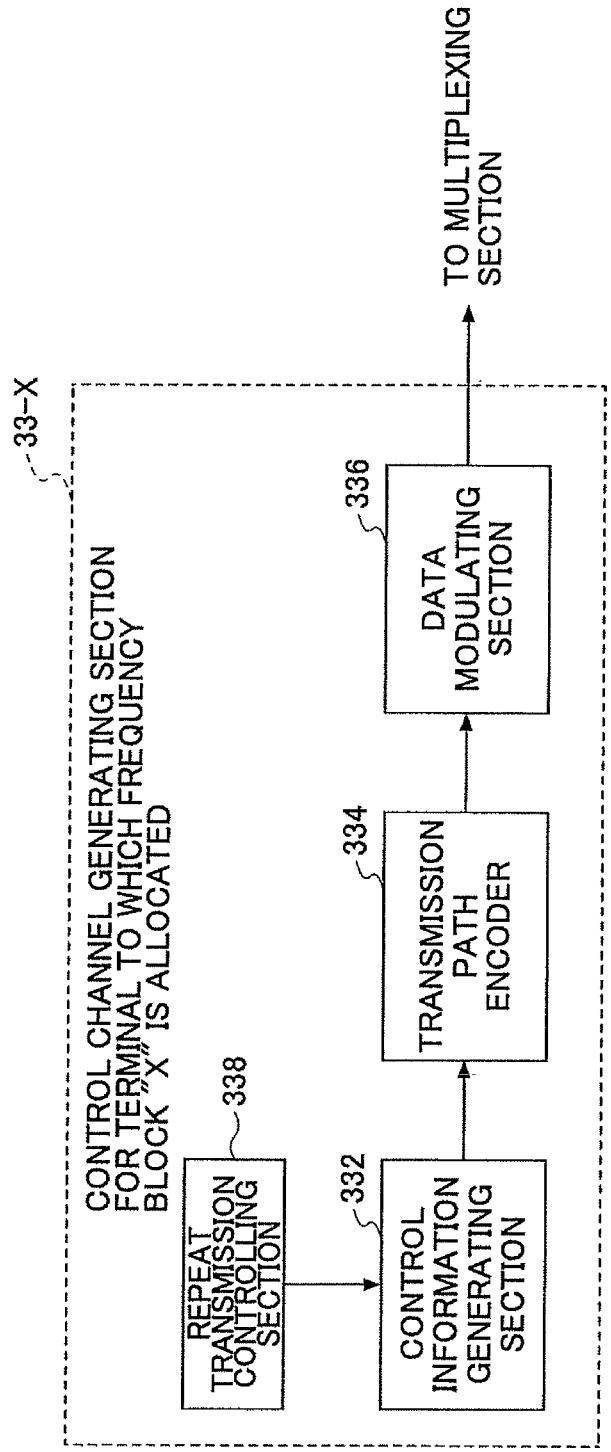
FIG. 4A is a partial block diagram showing a control channel generating section with respect to one frequency block.

FIG. 4A shows the control signaling channel generating section "33-$x$" with respect to a single frequency block (frequency block "x"). The reference symbol "x" denotes an integer in a range from "1" to "M". As shown in FIG. 4A, the control signaling channel generating section "33-$x$" includes a repeat transmission controlling section 338, a control information generation section 332, a transmission path encoder 334, and a data modulating section 336.

The repeat transmission controlling section 338 determines the number of the control channels (CCH) allocated to a single radio frame, and controls the control information generation section 332 so that, namely, a Transmission Time Interval (TTI) includes plural sub-frames and the same control bits are allocated into each of the sub-frames (Long TTI). The repeat transmission controlling section 338 determines how many times the control channels (CCH) are transmitted in a single radio frame. In this case, the first multiplexing section "1-1" multiplexes the control channels (CCH) in accordance with the determined number of the control channels (CCH) onto a single radio frame. As a result, one or plural control channels (CCH) are transmitted in one radio frame. For example, with respect to a user located close to a cell boundary who receives low downlink reception power, two or more times sub-frames are allocated. Sub-frame allocation information with respect to the TTI is transmitted to a mobile station or the like using signaling in a higher layer or the like.

In this case, the control channel (CCH) repeatedly transmitted is transmitted in the same transmission format.

Figure 5:
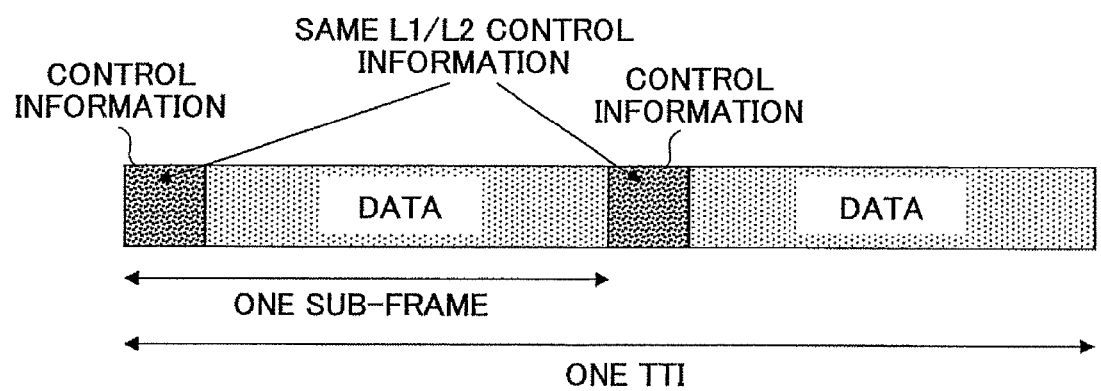
FIG. 5 is a drawing showing a method of transmitting a control channel (CCH)

For example, when the repeat transmission controlling section 338 determines that the control channel (CCH) is allocated two times in one radio frame, the control channel (CCH) is allocated two times in one radio frame as shown in FIG. 5. Namely, the same L1/L2 control information is transmitted twice in a single TTI. Otherwise, encoding may be performed for the transmission using a lower-rate transmission path encoding technique. FIG. 5 shows a case where the control channel (CCH) and the data channel are time-division multiplexed. However, the control channel (CCH) and the data channel may be frequency-division multiplexed.

The control information generation section 332 generates control information in accordance with the number of the control channels (CCH) allocated within one radio frame, the number being determined by the repeat transmission controlling section 338. The transmission path encoder 334 performs encoding on the control information transmitted from the control information generation section 332 by always using the same method in the sub-frame to be multiplexed, and transmits the encoded data to the data modulating section 336. As a result, the base station always transmits the same signal. Because of this feature, the overhead in the receiving side may be reduced, and the receiving side may improve the received SINR and enhances the signal quality by synthesizing the control bits. Further, the receiving side may modulate upon receiving the control channel (CCH). Namely, the receiving side may modulate at any timing. As a result, the coverage of the base station may be increased.

Figure 4B:
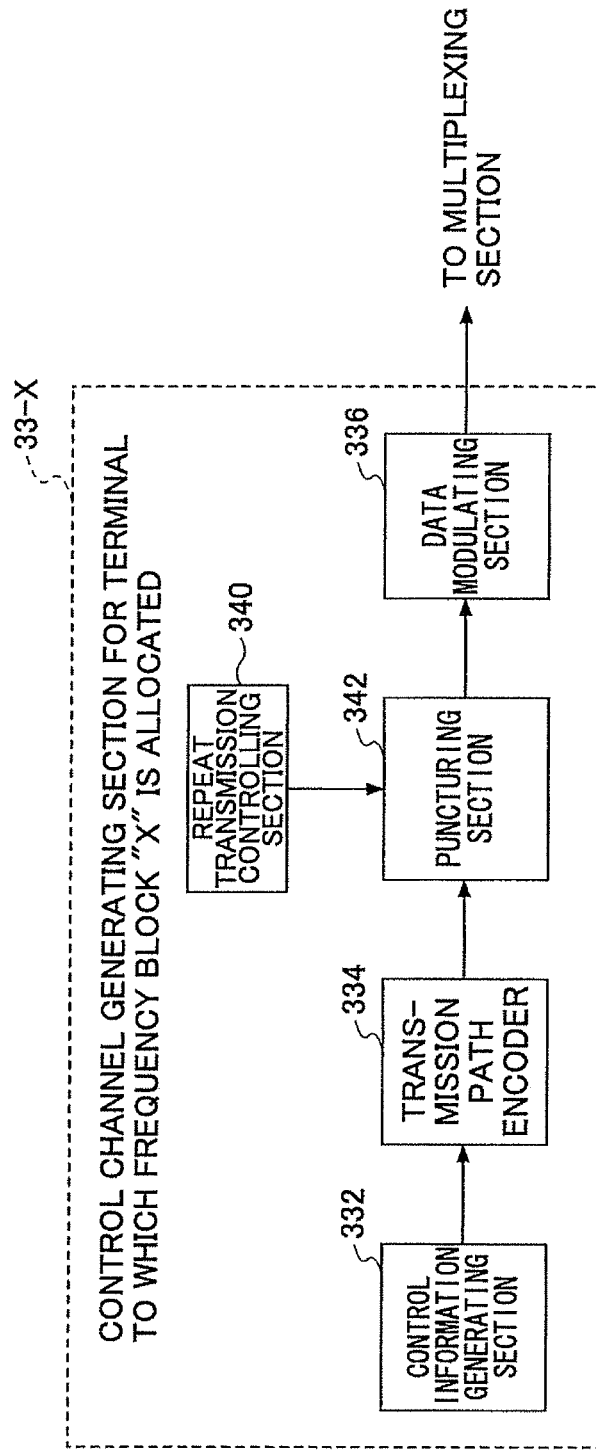
FIG. 4B is a partial block diagram showing another control channel generating section with respect to one frequency block.

Further, the control signaling channel generating section "33-$x$" may be provided as shown in FIG. 4B. FIG. 4B shows another control signaling channel generating section "33-$x$" with respect to a single frequency block (x frequency block). The reference symbol "x" denotes an integer in a range from "1" to "M". As shown in FIG. 4B, the control signaling channel generating section "33-x" includes the control information generation section 332, the transmission path encoder 334, a puncturing section 342, a repeat transmission controlling section 340, and a data modulating section 336.

In this case, when the control channel (CCH) is transmitted one or plural times, different puncture patterns are used with respect to each frame to be multiplexed for transmission.

The repeat transmission controlling section 340 determines the number of the control channels (CCH) allocated into a single radio frame, and controls the puncturing section 342. Namely, the repeat transmission controlling section 340 determines how many times the control channels (CCH) are transmitted in a single radio frame. Namely, a lower transmission path rate (introduction of repeating factor) is used. In this case, the first multiplexing section "1-1" multiplexes the control channels (CCH) in accordance with the determined number of the control channels (CCH) onto a single radio frame. As a result, one or plural control channels (CCH) are transmitted in one radio frame. In this case, the control channel (CCH) repeatedly transmitted is transmitted in the same transmission format.

Figure 6:
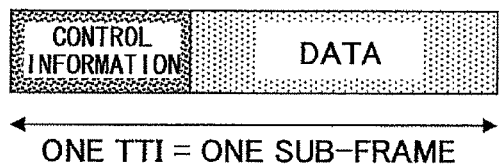
FIG. 6 is a drawing showing another method of transmitting the control channel (CCH)

The control information transmitted from the control information generation section 332 is encoded by the transmission path encoder 334, and then transmitted to the puncturing section 342. The puncturing section 342 performs puncturing using different puncture patterns with respect to each sub-frame to be multiplexed based on the number of the control channels (CCH) allocated to one radio frame, the number being determined by the repeat transmission controlling section 340. As a result, as shown in FIG. 6, the control channel (CCH) repeatedly transmitted is transmitted using different puncture patterns. FIG. 6 shows a case where the control channel (CCH) and the data channel are time-division multiplexed. However, the control channel (CCH) and the data channel may be frequency-division multiplexed.

By doing this, a part of a code word with a low coding rate may be transmitted. In the receiving side, by synthesizing the control information, the coding gain may be improved, thereby enabling improving the reception characteristics. Therefore, when compared with a case where the puncturing is not performed, the error rate may be reduced and the processing delay time in the receiving side may also be reduced.

FIG. 7A shows an example of mapping of the data channel and the control channel (CCH). The example shows a mapping with respect to one frequency block and one sub-frame and corresponds to the output content of the first multiplexing section "1-x" (on the other hand, the pilot channel and the like are multiplexed by the third multiplexing section 38). For example, one sub-frame may correspond to one transmission time interval (TTI) or plural TTIs. One or plural symbols constitute the resource block, and the resource block is allocated to the terminal having good channel quality by the frequency scheduling section 32 shown in FIG. 3.

For example, the control channel (CCH) and other channel such as data channel are time-division multiplexed. FIG. 7A shows a case where the number of users who are multiplexed with each other in the same sub-frame is "4". As shown in FIG. 7A, the control channel (CCH) is mapped onto the first half of the sub-frame, more specifically the second symbol of the sub-frame. By doing this, it becomes possible to reduce the processing delay in the mobile station when compared with a case where the control channel (CCH) and the other channel are frequency-division multiplexed. In the example of FIG. 7A, the mobile station may determine at the timing when the second symbol is demodulated whether the demodulation of the data channel is necessary.

Further, a time period for receiving the control channel (CCH) may be reduced. Therefore, the mobile station may perform micro-sleep because it is not necessary to perform a receiving process during the time period other than the reduced time period.

Further, as shown in FIG. 7B, the control channel (CCH) and the other channel may be frequency-division multiplexed. FIG. 7B shows a case where the number of users who are multiplexed with each other in the same sub-frame is "4". By doing this, the transmission power may be adjusted between the control channel and the data channel, thereby enabling increasing the coverage. In a case where the total transmission power is given as a constant, when the time-division multiplexing is performed, to increase the transmission power to transmit the control information to a user located far from the base station, it becomes necessary to reduce the transmission power for transmitting the control information to the other users. However, in a case where the frequency-division multiplexing is performed, when the transmission power to transmit the control information to a user located far from the base station is increased, the transmission power of the data channel is reduced because the data channel is multiplexed in the same time period. The reduction of the transmission power of the data channel may reduce the throughput, but this may not be so serious a problem when compared with a case where the transmission power of the control channel (CCH) is reduced.

Figure 8:
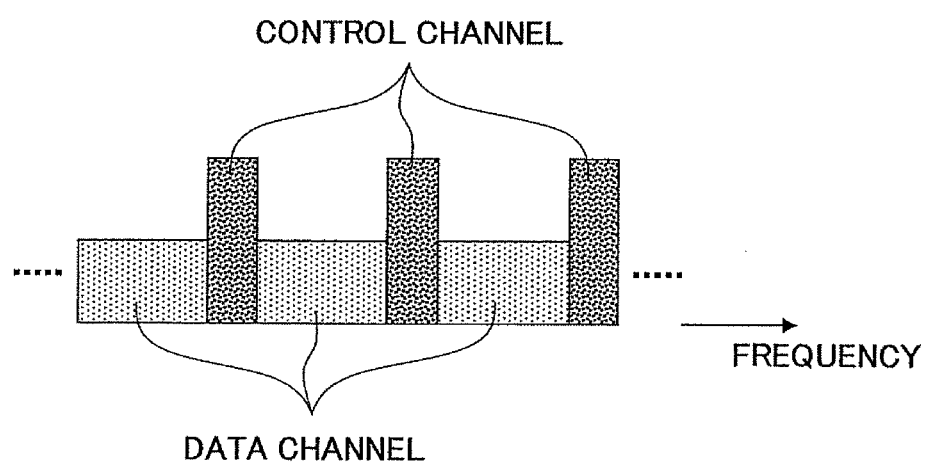
FIG. 8 is a drawing showing another method of transmitting a control channel (CCH)

The transmission power controlling section 41 controls the transmission power allocated to the control channel (CCH) and the data channel. For example, the transmission power controlling section 41 may control the transmission power for each resource block and each sub-carrier. As shown in FIG. 8, the transmission power controlling section 41 may maintain the total power at a constant value and allocate a greater amount of power to the control channel (CCH) and a smaller amount of power to the data channel. Namely, a part of the power to be allocated to the data channel may be allocated to the control channel. By doing this, the coverage area of the base station may be increased, and the processing delay in the receiving side may be reduced. This method may be used when the control channel (CCH) and the data channel are frequency-division multiplexed.

Further, an adaptive beam control technique may be used with respect to the control channel (CCH). By using this technique, the coverage may be increased.

Figure 9:
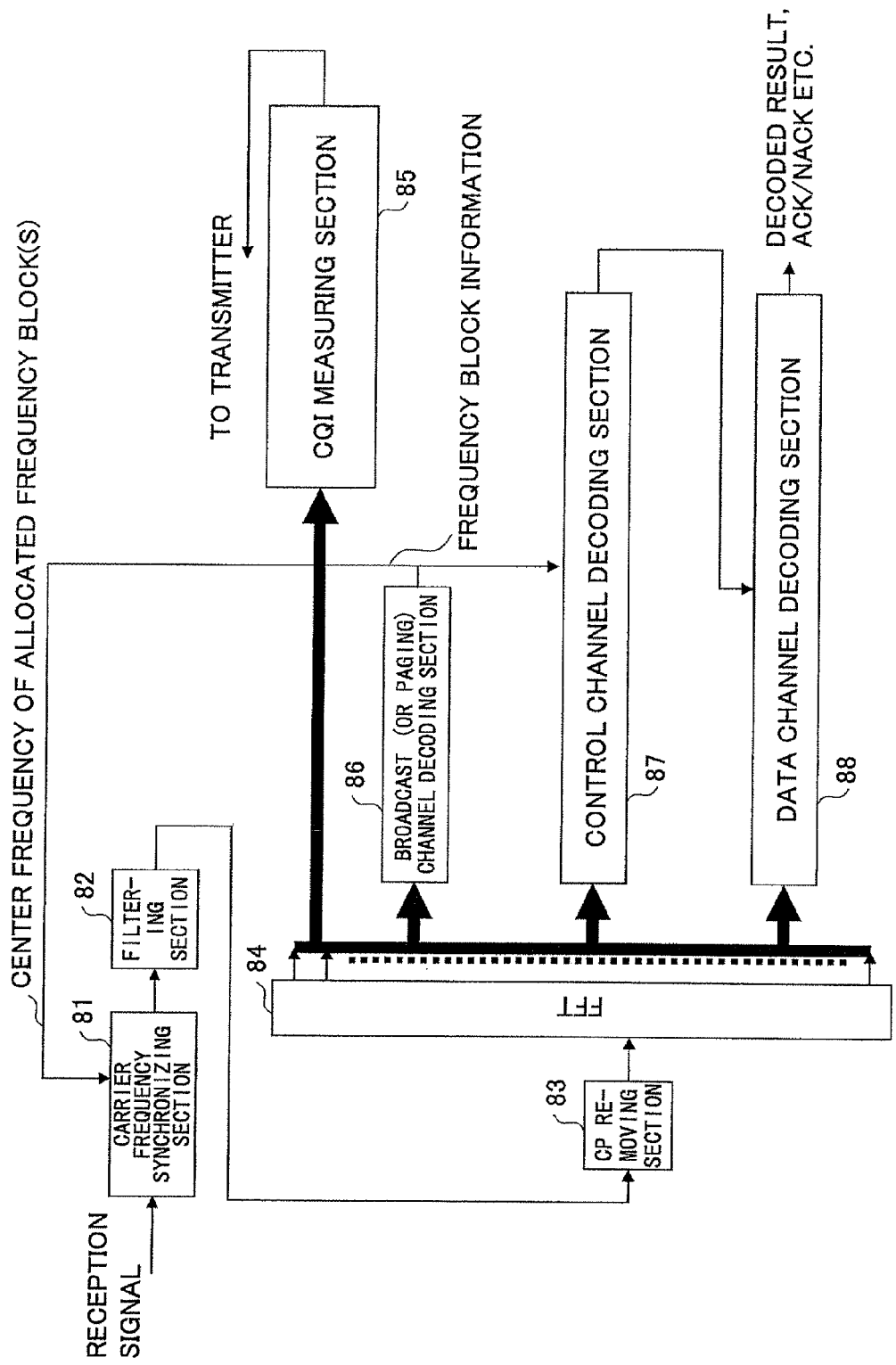
FIG. 9 is a partial block diagram showing a terminal according to an embodiment of the present invention.

FIG. 9 is a partial block diagram of a mobile terminal used in an embodiment of the present invention. As shown in FIG. 9, the mobile terminal includes a carrier frequency synchronizing section 81, a filtering section 82, a cyclic prefix removing section 83, an FFT converting section 84, a CQI measuring section 85, a broadcast channel (or paging channel) decoding section 86, a control channel decoding section 87, and a data channel decoding section 88.

The carrier frequency synchronizing section 81 adjusts the center frequency of the received bandwidth so that a signal of the frequency block allocated to the terminal is received.

The filtering section 82 performs filtering with respect to the received signal.

The cyclic prefix removing section 83 removes a guard interval from the received signal, and extracts an effective symbol portion from a received symbol.

The FFT converting section 84 performs a fast Fourier transform (FFT) conversion and an OFDM demodulation on the information included in the effective symbol.

The CQI measuring section 85 measures a received power level of the pilot channel included in the received signal, and transmits the measured result as the channel quality indicator (CQI) to the base station as a feedback signal. The CQI is measured for each resource block in the frequency blocks, and each measured CQI of all resource blocks is reported to the base station.

The broadcast channel (or paging channel) decoding section 86 decodes the broadcast channel (BCH). When a paging channel is included, the paging channel is also decoded.

The control channel decoding section 87 decodes the control channel (CCH) included in the received signal, and extracts the scheduling information and information items indicating the data modulation, the channel coding rate, and the HARQ of a shared data channel. The scheduling information includes an information item indicating whether a resource block is allocated to the shared data channel to be transmitted to the terminal and, when the resource block is allocated, an information item indicating a resource block number.

The data channel decoding section 88 decodes the shared data channel included in the received signal based on the information items extracted from the control channel (CCH). Based on the decoding result, an affirmative response (ACK) or a negative response (NACK) may be transmitted to the base station.

Figure 10:
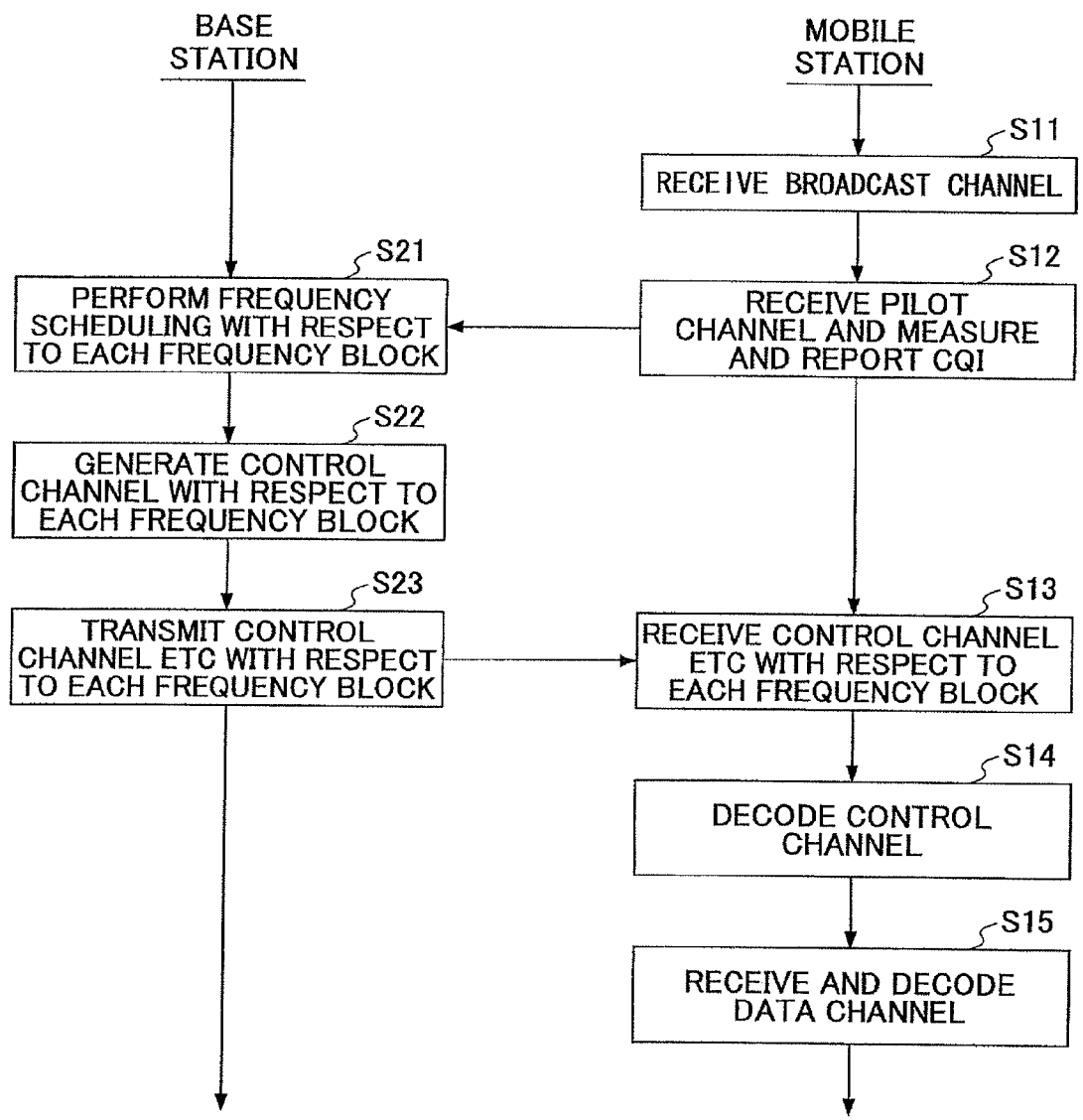
FIG. 10 is a flowchart showing exemplary operations according to an embodiment of the present invention.

FIG. 10 is a flowchart showing an example of operations according to an embodiment of the present invention. As an example, a case is described where a user having a mobile terminal "UE1" communicating using a bandwidth of 10 MHz enters into a cell or a sector where communications are being performed using a bandwidth of 20 MHz. It is assumed that the minimum frequency bandwidth of the communication system is 5 MHz and, as shown in FIG. 2, the total bandwidth is divided into four frequency blocks "1" through "4".

In step S11, the terminal "UE1" receives the broadcast channel (BCH) from the base station, and checks which frequency block(s) can be used by the own station. The broadcast channel (BCH) may be transmitted using a bandwidth of 5 MHz including the center frequency of the total bandwidth of 20 MHz. By doing this, it becomes possible for any of the terminals having different receivable bandwidths to receive the broadcast channel (BCH) easily. With respect to a user who communicates using a bandwidth of 10 MHz, the use of two frequency blocks adjacent with each other such as a combination of the frequency blocks "1" and "2", "2" and "3", or "3" and "4" is allowed for the broadcast channel (BCH). In this case, all the combinations or only a limited combination(s) may be allowed to be used. For example, in the following, it is assumed that the frequency blocks "2" and "3" are allowed to be used.

In step S12, the terminal "UE1" receives a downlink pilot channel, and measures the received signal quality of the frequency blocks "2" and "3". The measurements are performed with respect to each of the many resource blocks included in each of the frequency blocks. Eeach of the measurement results is reported to the base station as the corresponding Channel Quality Indicator (CQI).

In step S21, the base station performs frequency scheduling with respect to each of the frequency blocks based on the reported Channel Quality Indicators (CQI). The fact that the data channel to be transmitted to the "UE1" is to be transmitted using the frequency block "2" or "3" is checked and managed by the frequency block allocation controlling section 31 (in FIG. 3).

In step S22, the base station generates the control signaling channel with respect to each of the frequency blocks based on the schedule information. The control signaling channel includes an unspecified control channel and a specified control channel.

In step S23, in accordance with the scheduling information, the control channel (CCH) and the shared data channel with respect to each of the frequency blocks are transmitted from the base station.

In step S13, the terminal "UE1" receives the signals transmitted using the frequency blocks "2" and "3".

In step S14, the control channel (CCH) received using the frequency block "2" is decoded, and the scheduling information and information items indicating the data modulation, the channel coding rate, and the HARQ of the shared data channel are extracted.

In the same manner, the control channel (CCH) received using the frequency block "3" is decoded, and the scheduling information and information items indicating the data modulation, the channel coding rate, and the HARQ of the shared data channel are extracted. Each of the scheduling information includes an information item indicating whether a resource block is allocated to the shared data channel to be transmitted to the terminal "UE1", and, when the resource block is allocated, an information item indicating the resource block number. When there is no resource block allocated to the shared data channel to be transmitted to the own station terminal "UE1", the terminal "UE1" returns to its waiting state, and waits for the next reception of the control channel (CCH).

In step S15, when any of the resource blocks is allocated to the shared data channel to be transmitted to the own station, the terminal "UE1" decodes the shared data channel included in the received signal based on the information items extracted from the control channel (CCH). Depending upon the decoded result, an affirmative response (ACK) or a negative response (NACK) may be reported to the base station. After the above process is completed, the same process may be repeated.

In the above description, the present invention is described by being divided into several embodiments. However, it should be noted that the division of the present invention into several embodiments is not an essential element of the present invention. For example, two or more embodiment may be combined on as as-needed basis. To promote an understanding of the present invention, specific values are used as examples throughout the description. However, it should be noted that such specific values are just sample values unless otherwise described, and any other values may be used.

The present invention is described by referring to a specific embodiment. However, a person skilled in the art may understand that the above embodiment is described for illustrative purpose only and may think of examples of various modifications, transformations, alterations, changes, and the like. For illustrative purposes, the apparatus according to an embodiment of the present invention is described with reference to the functional block diagrams. However, such apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application No. 2006-169455 filed on Jun. 19, 2006, the entire contents of which are hereby incorporated herein by reference.

INDUSTRIAL APPLICABILITY

A base station and a transmission method according to an embodiment of the present invention may be used in a radio communication system.

The invention claimed is:

1. A communication terminal in a multi-carrier system using a frequency bandwidth including a plurality of resource blocks, each of the resource blocks including one or more sub-carriers, the communication terminal comprising:
   a receiving unit configured to receive a signal in which a control channel is multiplexed into a single radio frame based on a number of control channels allocated into the single radio frame to use a lower coding rate by repeating transmitting without changing encoding method wherein a channel other than the control channel is multiplexed in accordance with scheduling information for allocating one or more of the plurality of resource blocks to the communication terminal; and
   a processing unit configured to perform a process on the signal received by the receiving unit.

2. The communication terminal according to claim 1, wherein the scheduling information is determined based on a channel quality indicator reported from each of a plurality of communication terminals.

3. The communication terminal according to claim 1, wherein the control channel is received in a same transmission format.

4. The communication terminal according to claim 1, wherein the control channel is received using different puncture patterns.

5. The communication terminal according to claim 1, wherein a transmission power of the control channel and a data channel is controlled.

6. The communication terminal according to claim 1, wherein a number of users to be multiplexed into a same sub-frame is determined based on a channel quality information reported from each of a plurality of communication terminals.

7. The communication terminal according to claim 1, wherein adaptive beam control is performed on the control channel.

8. A receiving method used in a multi-carrier system using a frequency bandwidth including a plurality of resource blocks, each of the plurality of resource blocks including one or more sub-carriers, the receiving method comprising:
   receiving a signal in which a control channel is multiplexed into a single radio frame based on a number of control channels allocated into the single radio frame to use a lower coding rate by repeating transmitting without changing encoding method wherein a channel other than the control channel is multiplexed in accordance with scheduling information for allocating one or more of the plurality of resource blocks to the communication terminal; and
   performing a process on the received signal.

9. A communication system comprising a base station and a communication terminal based on a multi-carrier system using a frequency bandwidth including a plurality of resource blocks, each of the plurality of resource blocks including one or more sub-carriers, wherein the base station comprises:
   a frequency scheduler configured to determine scheduling information for allocating one or more of the plurality of resource blocks to a communication terminal;
   a multiplexing unit configured to multiplex the control channel into a single radio frame based on a number of control channels allocated into the single radio frame to use a lower coding rate by repeatedly transmitting without changing encoding method and further multiplex a channel other than the control channels in accordance with the scheduling information; and
   a transmission unit configured to transmit an output signal from the multiplexing unit based on the multi-carrier system.

* * * * *